United States Patent
Zhao et al.

(10) Patent No.: US 10,720,705 B2
(45) Date of Patent: Jul. 21, 2020

(54) 5G WIDEBAND MIMO ANTENNA SYSTEM BASED ON COUPLED LOOP ANTENNAS AND MOBILE TERMINAL

(71) Applicant: SHENZHEN SUNWAY COMMUNICATION CO LTD., Shenzhen, Guangdong (CN)

(72) Inventors: Anping Zhao, Shenzhen (CN); Zhouyou Ren, Shenzhen (CN)

(73) Assignee: SHENZHEN SUNWAY COMMUNICATION CO., LTD., Shenzhen (CN)

( * ) Notice: Subject to any disclaimer, the term of this patent is extended or adjusted under 35 U.S.C. 154(b) by 0 days.

(21) Appl. No.: 16/276,123

(22) Filed: Feb. 14, 2019

(65) Prior Publication Data
US 2020/0161765 A1 May 21, 2020

Related U.S. Application Data

(63) Continuation of application No. PCT/CN2019/070602, filed on Jan. 7, 2019.

(30) Foreign Application Priority Data

Nov. 19, 2018 (CN) .......................... 2018 1 1374186

(51) Int. Cl.
*H01Q 7/00* (2006.01)
*H01Q 1/38* (2006.01)
(Continued)

(52) U.S. Cl.
CPC ............ *H01Q 7/00* (2013.01); *H01Q 21/062* (2013.01); *H04B 7/0413* (2013.01)

(58) Field of Classification Search
CPC .......... H01Q 1/521; H01Q 1/243; H01Q 9/30; H01Q 5/10; H01Q 1/38; H01Q 21/06; (Continued)

(56) References Cited

U.S. PATENT DOCUMENTS

7,589,680 B2 * 9/2009 Tsai ...................... H01Q 1/2266
343/700 MS
8,890,754 B2 * 11/2014 Lin ........................ H01Q 5/335
343/700 MS
(Continued)

*Primary Examiner* — Pablo N Tran
(74) *Attorney, Agent, or Firm* — Oliff PLC (57) ABSTRACT

A 5G wideband MIMO antenna system based on coupled loop antennas and a mobile terminal are disclosed. The antenna system comprises at least four antenna units comprising an antenna frame, a first coupling branch, a second coupling branch, a feed branch and an ground branch, wherein one end of the first coupling branch and one end of the ground branch are overlapped in the thickness or length direction of the frame, one end of the second coupling branch and one end of the feed branch are overlapped in the thickness or length direction of the frame. A traditional loop antenna is converted into a coupled loop antenna with three coupling regions. The coupled loop antenna system is high in antenna efficiency, good in isolation, simple in structure and easy to manufacture and has a small height when placed vertically, thereby making the mobile terminal lighter and thinner.

18 Claims, 4 Drawing Sheets

(51) Int. Cl.
*H01Q 5/10* (2015.01)
*H01Q 21/28* (2006.01)
*H01Q 21/06* (2006.01)
*H04B 7/0413* (2017.01)

(58) Field of Classification Search
CPC ........ H01Q 21/28; H01Q 1/523; H01Q 13/10;
H01Q 1/2266; H01Q 9/42; H01Q 5/378;
H04B 7/0413
See application file for complete search history.

(56) References Cited

U.S. PATENT DOCUMENTS

| | | | |
|---|---|---|---|
| 9,252,490 B2* | 2/2016 | Wei | H01Q 9/04 |
| 10,103,449 B2* | 10/2018 | Wong | H01Q 5/10 |
| 2010/0103069 A1* | 4/2010 | Wang | H01Q 1/243 |
| | | | 343/846 |
| 2012/0019415 A1* | 1/2012 | Tseng | H01Q 1/243 |
| | | | 343/700 MS |
| 2013/0207861 A1* | 8/2013 | Huang | H01Q 13/10 |
| | | | 343/767 |
| 2013/0271326 A1* | 10/2013 | Shimasaki | H01Q 9/045 |
| | | | 343/700 MS |
| 2015/0022401 A1* | 1/2015 | Gavilan | H01Q 21/28 |
| | | | 343/702 |
| 2018/0309186 A1* | 10/2018 | Yu | H01Q 21/22 |
| 2019/0044232 A1* | 2/2019 | Tseng | H01Q 1/243 |
| 2019/0229398 A1* | 7/2019 | Ryoo | H01L 23/66 |
| 2020/0044329 A1* | 2/2020 | Wu | H01Q 1/521 |

* cited by examiner

5G WIDEBAND MIMO ANTENNA SYSTEM BASED ON COUPLED LOOP ANTENNAS AND MOBILE TERMINAL

TECHNICAL FIELD

The invention relates to the technical field of antennas, in particular to a 5G wideband MIMO antenna system based on coupled loop antennas, and a mobile terminal.

DESCRIPTION OF RELATED ART

The fifth-generation mobile communication technology (5G) will be commercially used on a large scale in 2020, and in the next few years, new mobile terminal antennas and base station antennas will have a broad application market. 5G includes a low frequency below 6 GHz (Sub-6 GHz) and a high frequency over 24 GHz (this high frequency generally refers to 5G millimeter waves). Compared with existing 4G, 5G has advantages in many aspects such as high transmission rate, short delay time and high reliability.

In order to realize the high transmission rate required by 5G, the multiple-input multiple-output (MIMO) technology is adopted for Sub-6 GHz application of 5G. As an important device of the MIMO wireless communication system, MIMO antennas play a decisive role in the MIMO wireless communication system. In essence, the MIMO technology is able to obtain a high space diversity gain by providing a time diversity gain and a space multiplexing gain for the system, so that the reliability of channels is effectively improved, the error rate of the channels is decreased, and finally, the data rate is increased. In terms of existing study of various countries, compared with 4G, the peak rate of 5G is increased by over 20 times, and thus, the MIMO antenna structure including two or four antennas in a 4G system cannot meet the requirement of a 5G system for the transmission rate and the connection reliability anymore. A MIMO antenna structure including more antennas, such as eight MIMO antennas, in the 5G sub-6 GHz system will be applied to handheld devices. Due to the fact that the space occupied by the antennas is in direct proportion to the number of the antennas, how to place multiple antennas in a limited space of the handheld devices is still a problem yet to be solved. In addition, because the handheld devices are increasingly thinner and have an increasingly narrower frame (full screen), the MIMO antenna structure both meeting the requirement for the antenna efficiency and meeting the requirement for the isolation between antennas is becoming more and more complex.

Another challenge for the application of the 5G Sub-6 GHz system is how to design a wideband antenna system capable of covering all 5G Sub-6 GHz frequency bands. Three frequency bands, namely N77 3.3-4.2 GHz, N78 3.3-3.8 GHz and N79 4.4-5.0 GHz of 5G Sub-6 GHz have been released by 3GPP, and all the countries can select proper specific frequency bands from these three frequency bands in terms of specific conditions, for instance, MIIT has released, on Nov. 9, 2017, the following three frequency bands: 3.3 GHz-3.4 GHz, 3.4-3.6 GHz and 4.8 GHz-5 GHz, and these three frequency bands are used as operating frequency bands of 5G systems in China. Up to now, there are many MIMO antenna designs including different numbers of antennas, but most of these MIMO antenna designs can only cover one or two 5G frequency bands. For this reason, it is especially important to design a MIMO antenna system which is good in performance and capable of covering all Sub-6 GHz frequency bands (from 3.3 GHz to 5 GHz) in the 5G system and includes multiple antennas (such as eight antennas).

BRIEF SUMMARY OF THE INVENTION

The technical issue to be settled by the invention is to provide a 5G wideband MIMO antenna system based on coupled loop antennas, and a mobile terminals, wherein the 5G wideband MIMO antenna system based on coupled loop antennas is capable of covering all 5G frequency bands below 6 GHz and is good in antenna performance.

The technical solution adopted by the invention to settle the above-mentioned technical issue is as follows:

A 5G wideband MIMO antenna system based on coupled loop antennas comprises at least four antenna units. The antenna unit comprises an antenna frame, a first coupling branch, a second coupling branch, a feed branch and a ground branch, wherein the first coupling branch, the second coupling branch, the feed branch and the ground branch are fixedly disposed on the frame, one end of the first coupling branch and one end of the ground branch are overlapped in the thickness or length direction of the frame, and one end of the second coupling branch and one end of the feed branch are overlapped in the thickness or length direction of the frame.

Furthermore, an end, away from the ground branch, of the first coupling branch and an end, away from the feed branch, of the second coupling branch are overlapped in the thickened or height direction of the frame.

Herein, when distributed on different planes, the coupling branches are overlapped in the thickness direction of the frame; and when distributed on the same plane, the coupling branches are overlapped in the length or height direction of the frame. In other words, the coupling branches are overlapped when distributed on two different planes of the frame or when distributed on the same plane of the frame.

Furthermore, the first coupling branch and the feed branch are disposed on one side of the frame, and the second coupling branch and the ground branch are disposed on another side of the frame; and one end of the first coupling branch and one end of the second coupling branch are overlapped in the thickness direction of the frame, the other end of the first coupling branch and one end of the ground branch are overlapped in the thickness direction, and the other end of the second coupling branch and one end of the feed branch are overlapped in the thickness direction of the frame.

Furthermore, the first coupling branch and the second coupling branch are in an L shape, and the ground branch and the feed branch are identical in shape.

Furthermore, a grounding point is arranged at an end, away from the first coupling branch, of the ground branch, and a feed point is arranged at an end, away from the second coupling branch, of the feed branch.

Furthermore, the antenna unit further comprises a microstrip line electrically connected with the feed point.

Furthermore, the length of an overlapped part of the first coupling branch and the ground branch is equal to the length of an overlapped part of the second coupling branch and the feed branch.

Furthermore, the frame is made from a dielectric material.

Furthermore, the number of the antenna units is eight.

Furthermore, the antenna units operate within a frequency range of 3.3-5 GHz.

Another technical solution of the invention is as follows:

A mobile terminal comprises the 5G wideband MIMO antenna system based on coupled loop antennas.

The invention has the following beneficial effects: one end of the first coupling branch and one end of the ground branch are partially overlapped instead of being directly connected, and one end of the second coupling branch and one end of the feed branch are partially overlapped instead of being directly connected, so that three coupling regions are formed on the antenna unit and are capable of covering all 5G frequency bands below 6 GHz, and the antenna unit is high in antenna efficiency, good in isolation and suitable for mobile terminals such as mobile phones. The antenna system is simple in structure and easy to machine and manufacture and has a small height when placed vertically, thereby making the mobile terminals lighter and thinner.

Reference Signs:
1, PCB; 2, antenna unit; 21, antenna frame; 22, first coupling branch; 221, horizontal part; 222, vertical part; 23, second coupling branch; 24, feed branch; 241, feed point; 25, ground branch; 251, grounding point; 26, microstrip line; 3, first position; 4, second position; 5, third position; 5, fourth position.

DETAILED DESCRIPTION OF THE INVENTION

The technical contents, objectives and effects of the invention are expounded below with reference to embodiments and accompanying drawings.

The key conception of the invention is that a traditional loop antenna is partitioned from the two sides and the upper part to form two or three coupling regions capable of covering all 5G frequency bands below 6 GHz. Particularly, besides the two coupling regions on the two sides of the loop antenna, a coupling region is added to the upper part of the loop antenna, so that the antenna performance is better improved.

Figure 2:
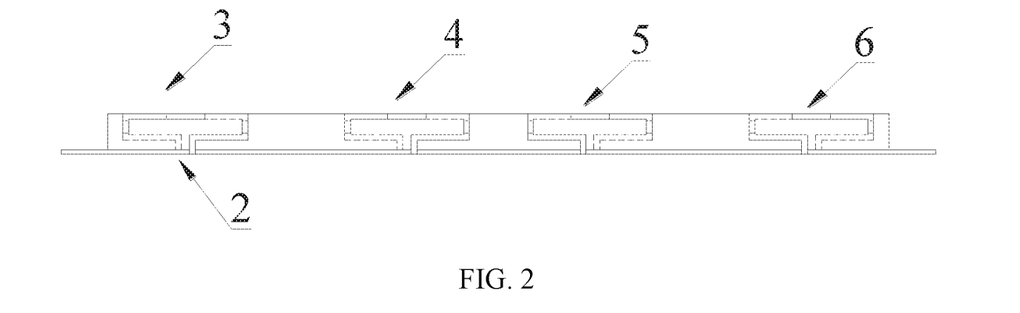
FIG. 2 is a side view of the mobile terminal adopting the MIMO antenna system including eight antenna units in embodiment 1 of the invention.
Figure 3:
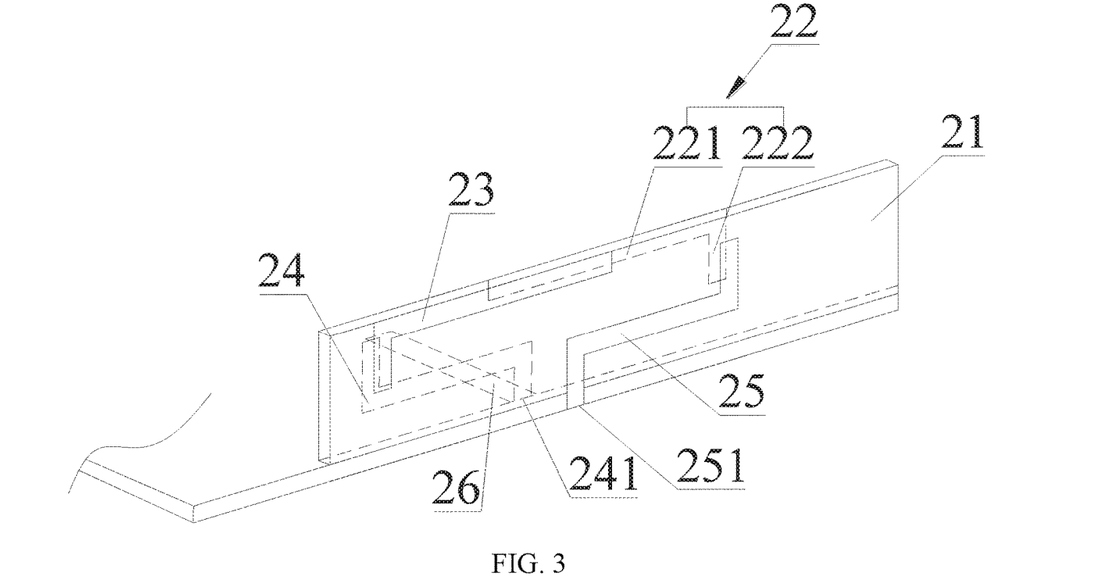
FIG. 3 is a structural view of the antenna unit in embodiment 1 of the invention.

Referring to FIG. 2 and FIG. 3, a 5G wideband MIMO antenna system based on coupled loop antennas comprises at least four antenna units 2. The antenna unit 2 comprises an antenna frame 21, a first coupling branch 22, a second coupling branch 23, a feed branch 24 and a ground branch 25, wherein the first coupling branch 22, the second coupling branch 23, the feed branch 24 and the ground branch 25 are fixedly disposed on the frame 21, one end of the first coupling branch 22 and one end of the ground branch 25 are overlapped in the thickness or length direction of the frame 21, and one end of the second coupling branch 23 and one end of the feed branch 24 are overlapped in the thickness or length direction of the frame 21.

From the above description, the invention has the following beneficial effects: one end of the first coupling branch and one end of the ground branch are partially overlapped instead of being directly connected, and one end of the second coupling branch and one end of the feed branch are partially overlapped instead of being directly connected, so that three coupling regions are formed on a loop antenna and are capable of covering all 5G frequency bands below 6 GHz, and the loop antenna is high in antenna efficiency, good in isolation and suitable for mobile terminals such as mobile phones. The 5G wideband MIMO antenna system is simple in structure and easy to manufacture and has a small height when placed vertically, thereby making the mobile terminals lighter and thinner. In the invention, when overlapped in the thickness direction, the antenna branches are located on different planes of the frame; and when overlapped in the length direction, the antenna branches are located on the same plane of the frame.

Furthermore, an end, away from the ground branch 25, of the first coupling branch 22 and an end, away from the feed branch 24, of the second coupling branch 23 are overlapped in the thickness or height direction of the frame 21.

From the above description, one end of the first coupling branch and one end of the second coupling branch are overlapped, so that the antenna performance is further improved; when the first coupling branch and the second coupling branch are overlapped in the thickness direction, the two antenna branches are located on different planes of the frame; and when the first coupling branch and the second coupling branch are overlapped in the height direction, the two antenna branches are located on the same plane of the frame.

Furthermore, the first coupling branch 22 and the feed branch 24 are disposed on one side of the frame 21, and the second coupling branch 23 and the ground branch 25 are disposed on another side of the frame 21; and one end of the first coupling branch 22 and one end of the second coupling branch 23 are overlapped in the thickness direction of the frame 21, the other end of the first coupling branch 22 and one end of the ground branch 25 are overlapped in the thickness direction of the frame 21, and the other end of the second coupling branch 23 and one end of the feed branch 24 are overlapped in the thickness direction of the frame 21.

From the above description, the first coupling branch and the second coupling branch can be disposed on different planes, and the ground branch and the feed branch can be disposed on different planes.

Furthermore, the first coupling branch 22 and the second coupling branch 23 are in an L shape, and the ground branch 25 and the feed branch 24 are identical in shape.

From the above description, the first coupling branch and the second coupling branch can be completely identical in shape and size, and the first coupling branch and the second coupling branch can be, but are not limited to, the L shape and can also be in an arc shape or the like.

Furthermore, the ground branch 25 and the feed branch 24 are identical in shape.

Furthermore, a grounding point 251 is disposed at an end, away from the first coupling branch 22, of the ground branch 25, and a feed point is disposed at an end, away from the second coupling branch 23, of the feed branch 24.

Furthermore, the antenna unit 2 further comprises a microstrip line 26 electrically connected with the feed point 241.

Furthermore, the length of an overlapped part of the first coupling branch 22 and the ground branch 25 is equal to the length of an overlapped part of the second coupling branch 23 and the feed branch 24.

Furthermore, the frame 21 is made from a dielectric material.

From the above description, the frame is a LDS frame, an ABS plastic frame, a PCB or the like.

Furthermore, the number of the antenna units 2 is eight.

Furthermore, the antenna units 2 operate within a frequency range of 3.3-5 GHz.

From the above description, the antenna system is capable of covering all 5G frequency bands below 6 GHz.

Figure 1:
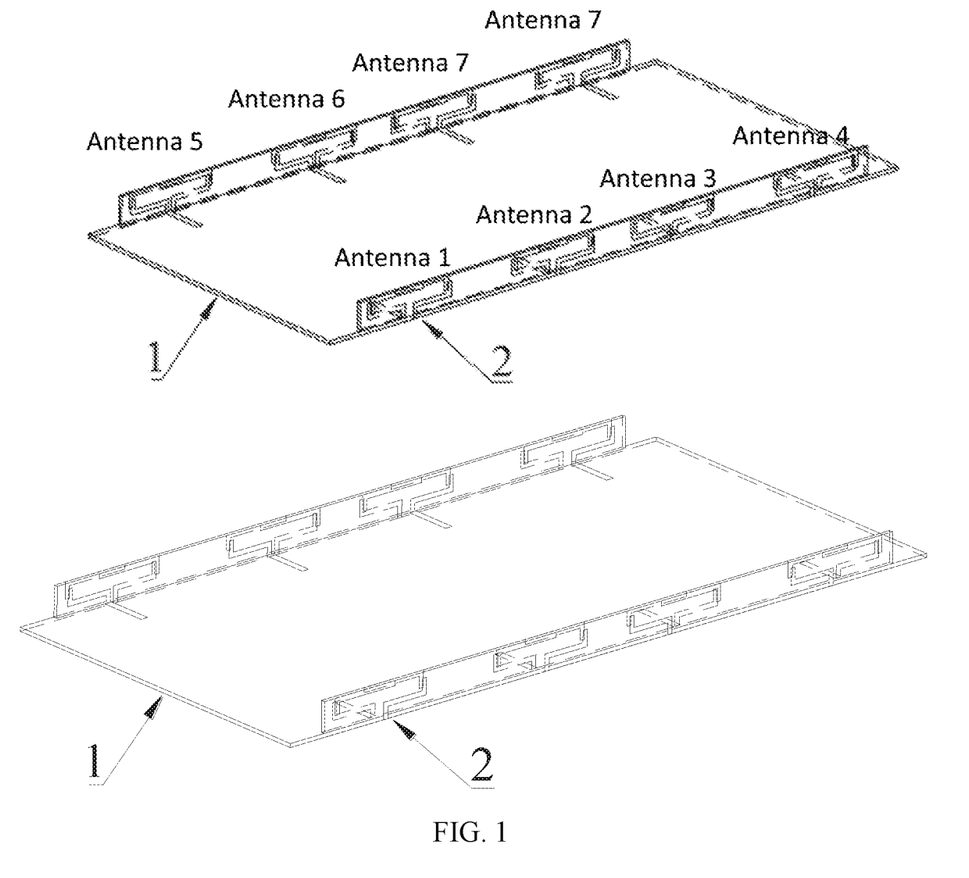
FIG. 1 is a structural view of a mobile terminal adopting a 5G wideband MIMO antenna system including eight antenna units in embodiment 1 of the invention.

Referring to FIG. 1, another technical solution adopted by the invention is as follows:

A mobile terminal comprises the 5G wideband MIMO antenna system based on coupled loop antennas.

Referring to FIGS. 1-10, in embodiment 1 of the invention:

As shown in FIG. 1, the mobile terminal comprises the 5G wideband MIMO antenna system based on coupled loop antennas and a PCB 1. The MMO antenna system comprises at least four antenna units 2. In this embodiment, the number of the antenna units 2 is eight. The mobile terminal is rectangular, the eight antenna units 2 are disposed on two long edges of the mobile terminal in such a manner that each long edge is provided with four antenna units 2, and the antenna units 2 on one long edge are symmetrical with the antenna units 2 on the other long edge with respect to short edges. As shown in FIG. 2, the antenna unit 2 at a first position 3 and the antenna unit 2 at a second position 4 are arranged in the same direction, the antenna unit 2 at a third position 5 and the antenna unit 2 at a fourth position 6 are arranged on the same direction, the antenna unit 2 at the second position 4 and the antenna unit 2 at the third position 5 are arranged in opposite directions, and the antenna unit 2 at the second position 4 and the antenna unit 2 at the third position 5 are symmetrical with respect to the midpoint of the corresponding long edge, and the antenna unit 2 at the first position 3 and the antenna unit 2 at the fourth position 6 are symmetrical with respect to the midpoint of the corresponding long edge. The above configuration of the antenna units 2 is only a preferred one which can fulfill the optimal or best isolation between the antenna units 2, and other configurations of the antenna units 2 can also be adopted according to requirements. In this embodiment, the antenna units 2 are perpendicular to the PCB 1, and in other embodiments, the antenna units 2 may have other angles with respect to the PCB 1.

As shown in FIG. 3, the antenna unit 2 comprises an antenna frame 21, a first coupling branch 22, a second coupling branch 23, a feed branch 24 and a ground branch 25, wherein the first coupling branch 22, the second coupling branch 23, the feed branch 24 and the ground branch 25 are fixedly disposed on the frame 21. In this embodiment, one end of the first coupling branch 22 and one end of the ground branch 25 are overlapped in the thickness or length direction of the frame 21, and one end of the second coupling branch 23 and one end of the feed branch 24 are overlapped in the thickness or length direction of the frame 21. Preferably, an end, away from the ground branch 25, of the first coupling branch 22 and an end, away from the feed branch 24, of the second coupling branch 23 are overlapped in the thickness or height direction of the frame 21. Preferably, the first coupling branch 22 and the feed branch 24 are disposed on one side of the frame 21, and the second coupling branch 23 and the ground branch 25 are disposed on another side of the frame 21; one end of the first coupling branch 22 and one end of the second coupling branch 23 are overlapped in the thickness direction of the frame 21, the other end of the first coupling branch 22 and one end of the ground branch 25 are overlapped in the thickness direction of the frame 21, and the other end of the second coupling branch 23 and one end of the feed branch 24 are overlapped in the thickness direction of the frame 21; and the frame 21 is made from plastic or other dielectric materials. In this embodiment, the first coupling branch 22 and the second coupling branch 23 are in an L shape and have the same length, and the first coupling branch 22 and the second coupling branch 23 can also be in other shapes such as an arc shape. When the first coupling branch 22 and the second coupling branch 23 are in an L shape, the first coupling branch 22 and the second coupling branch 23 each comprise a horizontal part 221 and a vertical part 222, and the length of an overlapped part of the first coupling branch 22 and the second coupling branch 23 is smaller than the length of the horizontal parts 221. The ground branch 25 and the feed branch 24 are identical in shape. Preferably, the length of an overlapped part of the first coupling branch 22 and the ground branch 25 is equal to the length of the overlapped part of the second coupling branch 23 and the feed branch 24 and is smaller than the length of the vertical parts 222. In this embodiment, the two vertical parts 222 are separately located on the left side and the right side of the horizontal parts 221, and the lengths of the three overlapped parts are used for regulating the S11 impedance matching of the antenna unit 2 and can be set according to specific requirements. A grounding point 251 is arranged at an end, away from the first coupling branch 22, of the ground branch 25. A feed point 241 is arranged at an end, away from the second coupling branch 23, of the feed branch 24. The antenna unit 2 further comprises a microstrip line 26 electrically connected with the feed point 241 and fixedly disposed on the PCB 1.

In this embodiment, the performance of the MIMO antenna system including eight antenna units is tested, wherein the PCB has a size of 150 mm*75 mm*0.8 mm, the horizontal parts have a length of 21.5 mm, the length of the overlapped part of the first coupling branch and the second coupling branch is 10 mm, the length of the overlapped part of the first coupling branch and the ground branch and the length of the overlapped part of the second coupling branch and the feed branch are both 1.5 mm, and the antenna units have a height of 6 mm.

Figure 4:
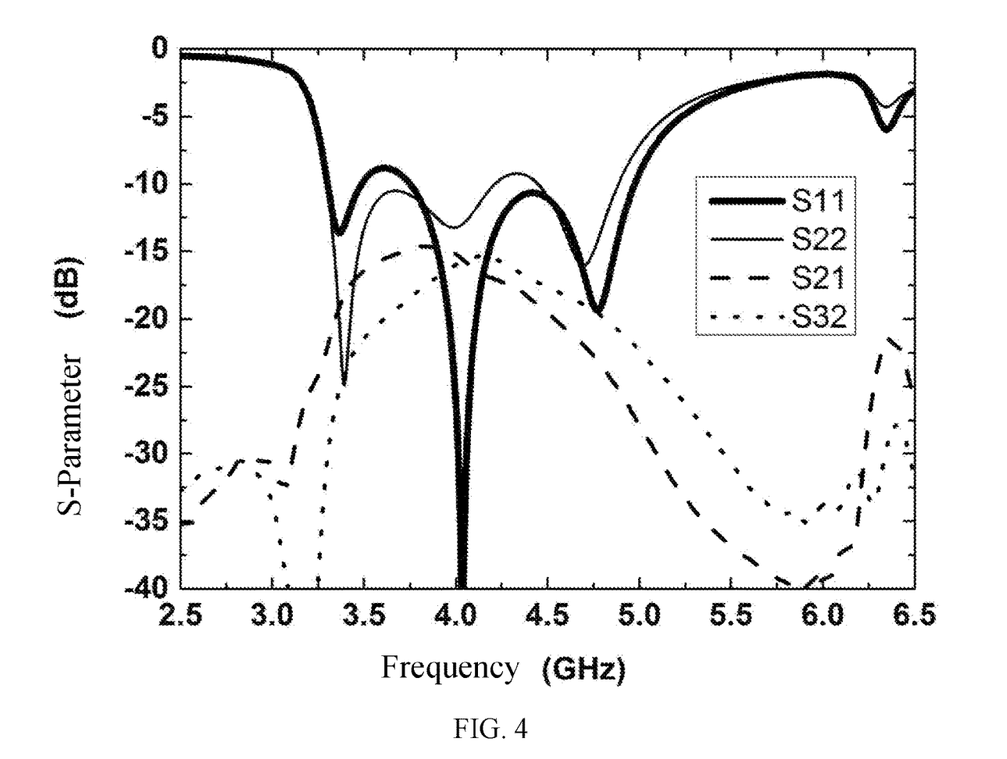
FIG. 4 is an S-parameter diagram of the MIMO antenna system including eight antenna units in embodiment 1 of the invention.

FIG. 4 is an S-parameter diagram of the MIMO antenna system including eight antenna units. As the antenna system is of a symmetrical structure, only the return loss curves of the antenna unit at the first position (antenna 1) and the antenna unit at the second position (antenna 2) are provided, and only the isolation between antenna 1 and antenna 2; and the isolation between antenna 2 and the antenna unit at the third position (antenna 3) are provided. As can be seen from curve S11 and curve S22 in FIG. 4, within the frequency range of 3.3-5 GHz, the S-parameter of the antenna units is below −6 dB and meets the requirement. As also can be seen from curve S21 and curve S32, the minimum isolation between the antenna units is better than −14.6 dB.

Figure 5:
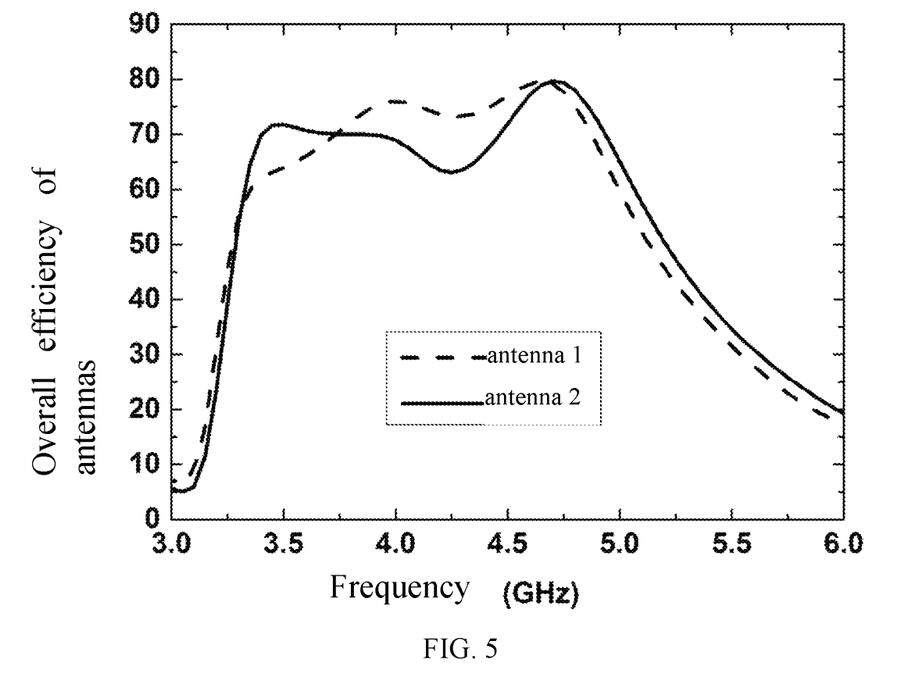
FIG. 5 is an antenna overall efficiency diagram of the MIMO antenna system including eight antenna units in embodiment 1 of the invention.

FIG. 5 shows the overall efficiency of the antenna unit at the first position (antenna 1) and the overall efficiency of the antenna unit at the second position (antenna 2) in the MIMO antenna system including eight antenna units. As can be seen from FIG. 5, the overall efficiency of antenna 1 and the overall efficiency of antenna 2 are both over 45% within the whole frequency range of 3.3-5 GHz.

As can be seen from FIG. 4 and FIG. 5, the MIMO antenna system including eight antenna units completely meets the technical requirements for the bandwidth and isolation of 5G MIMO antennas operating within the frequency of 3.3-5 GHz.

Figure 6:
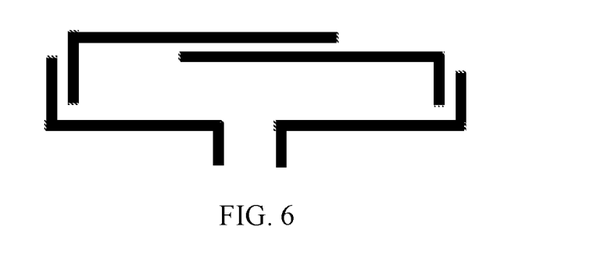
FIG. 6 is a simplified diagram of the antenna unit in embodiment 1 of the invention.
Figure 7:
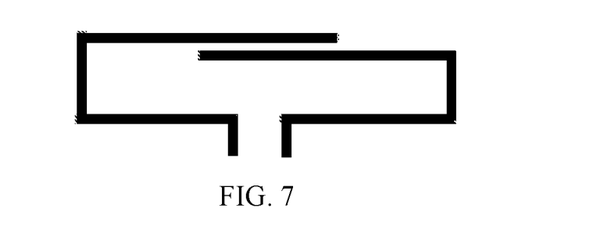
FIG. 7 is a simplified diagram of a loop antenna unit with upper horizontal parts coupled.
Figure 8:
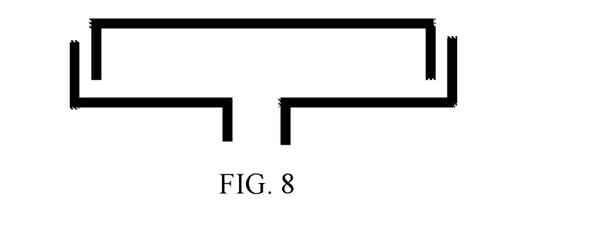
FIG. 8 is a simplified diagram of a loop antenna unit with vertical parts on two sides coupled.
Figure 9:
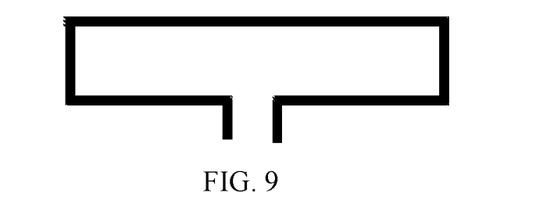
FIG. 9 is a simplified diagram of a traditional loop antenna unit.

For a better description of the operating principle of the antenna system of the invention, the following four types of antennas are compared with the antenna unit at the first position (antenna 1) with an example: (1) coupled loop antenna of the invention (shown in FIG. 6); (2) loop antenna with the horizontal parts overlapped (shown in FIG. 7); (3) loop antenna with the vertical parts overlapped (shown in FIG. 8); (4) traditional loop antenna (shown in FIG. 9). What needs to be pointed out is that FIGS. 6-9 are simplified diagrams of the antenna units, and particularly, FIG. 6 is a simplified diagram of FIG. 3.

Figure 10:
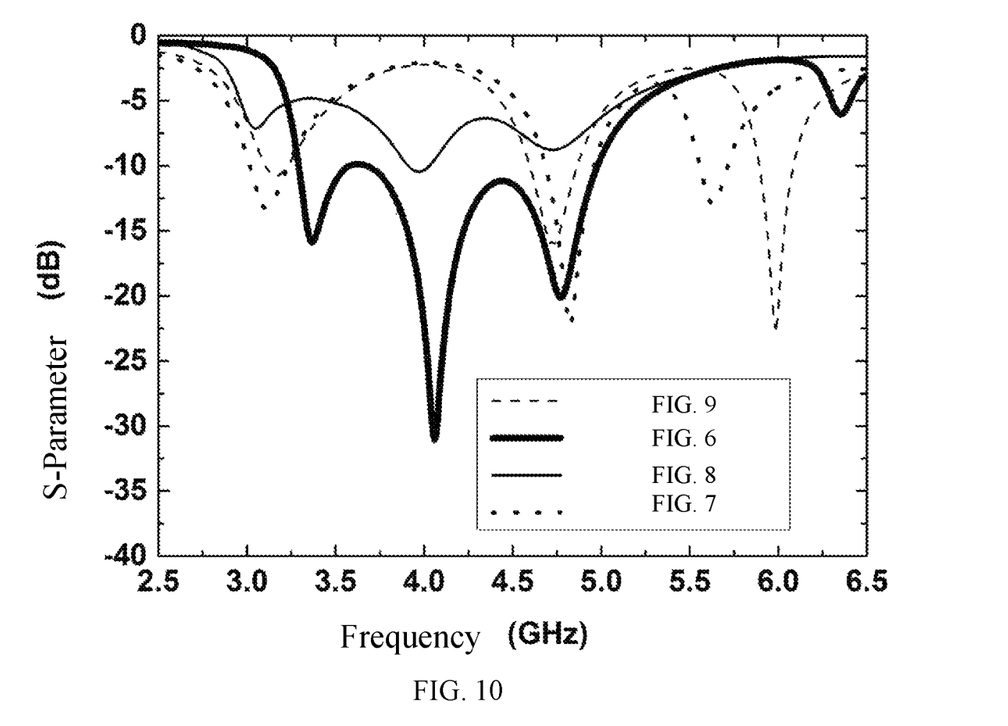
FIG. 10 is an S-parameter diagram of the antenna units in FIGS. 6-9.

FIG. 10 is an S-parameter diagram of the four different types of antenna systems mentioned above. As can be seen from FIG. 10, compared with the traditional loop antenna, when the vertical parts of the antenna are overlapped, an extra resonance is generated between the first original resonance and the second original resonance by the loop antenna in FIG. 8, which means that an extra resonance is generated near 4 GHz. Namely, when the vertical parts of the loop antenna are overlapped, three resonances will be generated below 5 GHz, and the return loss of each resonance is below −6 dB, so that the use requirements of mobile phone antennas are met. Because the third resonance is generated between the first original resonance and the second original resonance (near 4 GHz) by the loop antenna in FIG. 8, the frequency band of the antenna is obviously widened, and the wideband performance is realized. In order to further improve the antenna performance, the horizontal parts of the loop antenna are also overlapped, as shown in FIG. 6. As can be seen from FIG. 10, when one horizontal part is overlapped with two vertical parts, the return losses of the three resonances are greatly reduced, and the antenna performance is greatly improved.

Based on the structure of the traditional loop antenna, an extra resonance is generated between the first resonance and the second resonance of the traditional loop antenna for the first time. It is made possible through the extra resonance that the coupled loop antenna has a wideband and is capable of covering all 5G Sub-6 GHz frequency bands.

The antenna design principle of the invention can also be applied to wideband MIMO antenna systems operating within other frequency bands and provided with different numbers of antenna units. Meanwhile, any transformations to the antenna in the technical solutions should also fall within the protection scope of the invention. For instance, the coupling branches can also be located in the same horizontal plane instead of being limited to the configuration that the first coupling branch and the second coupling branch are located in different planes in this embodiment, and any improvements to the traditional loop antenna to fulfill three coupling regions at different positions should fall within the protection scope of the invention.

In conclusion, the 5G wideband MIMO antenna system based on coupled loop antennas is high in antenna efficiency, good in isolation, simple in structure and easy to manufacture and has a small height when placed vertically, thereby making the mobile terminal lighter and thinner.

The above embodiments are only preferred ones of the invention and are not intended to limit the patent scope of the invention. All equivalent transformations s based on the specification and the accompanying drawings, or direct or indirect applications to other relevant technical fields should also fall within the patent protection scope of the invention.

The invention claimed is:

1. A 5G wideband MIMO antenna system based on coupled loop antennas, comprising at least four antenna units, wherein the antenna unit comprises an antenna frame, a first coupling branch, a second coupling branch, a feed branch and a ground branch, the first coupling branch, the second coupling branch, the feed branch and the ground branch are fixedly disposed on the frame, one end of the first coupling branch and one end of the ground branch are overlapped in a thickness or length direction of the frame, one end of the second coupling branch and one end of the feed branch are overlapped in the thickness or length direction of the frame.

2. The 5G wideband MIMO antenna system based on coupled loop antennas according to claim 1, wherein an end, away from the ground branch, of the first coupling branch and an end, away from the feed branch, of the second coupling branch are overlapped in a thickness or height direction of the frame.

3. The 5G wideband MIMO antenna system based on coupled loop antennas according to claim 2, wherein the first coupling branch and the feed branch are disposed on one side of the frame, and the second coupling branch and the ground branch are disposed on another side of the frame; and one end of the first coupling branch and one end of the second coupling branch are overlapped in the thickness direction of the frame, another end of the first coupling branch and one end of the ground branch are overlapped in the thickness direction of the frame, and another end of the second coupling branch and one end of the feed branch are overlapped in the thickness direction of the frame.

4. The 5G wideband MIMO antenna system based on coupled loop antennas according to claim 1, wherein the first coupling branch and the second coupling branch are in an L shape, and the ground branch and the feed branch are identical in shape.

5. The 5G wideband MIMO antenna system based on coupled loop antennas according to claim 1, wherein a grounding point is arranged at an end, away from the first coupling branch, of the ground branch, and a feed point is arranged at an end, away from the second coupling branch, of the feed branch.

6. The 5G wideband MIMO antenna system based on coupled loop antennas according to claim 4, wherein the antenna unit further comprises microstrip line electrically connected with the feed point.

7. The 5G wideband MIMO antenna system based on coupled loop antennas according to claim 1, wherein an overlapped part of the first coupling branch and the ground branch has a length equal to a length of an overlapped part of the second coupling branch and the feed branch.

8. The 5G wideband MIMO antenna system based on coupled loop antennas according to claim 1, wherein the frame is made from a dielectric material.

9. The 5G wideband MIMO antenna system based on coupled loop antennas according to claim 1, wherein the antenna units operate within a frequency range of 3.3-5 GHz.

10. A mobile terminal, comprising the 5G MIMO antenna system based on coupled loop antennas according to claim 1.

11. A mobile terminal, comprising the 5G MIMO antenna system based on coupled loop antennas according to claim 2.

12. A mobile terminal, comprising the 5G MIMO antenna system based on coupled loop antennas according to claim 3.

13. A mobile terminal, comprising the 5G MIMO antenna system based on coupled loop antennas according to claim 4.

14. A mobile terminal, comprising the 5G MIMO antenna system based on coupled loop antennas according to claim 5.

15. A mobile terminal, comprising the 5G MIMO antenna system based on coupled loop antennas according to claim 6.

16. A mobile terminal, comprising the 5G MIMO antenna system based on coupled loop antennas according to claim 7.

17. A mobile terminal, comprising the 5G MIMO antenna system based on coupled loop antennas according to claim 8.

18. A mobile terminal, comprising the 5G MIMO antenna system based on coupled loop antennas according to claim 9.

* * * * *